(12) United States Patent
Toskala et al.

(10) Patent No.: US 7,079,507 B2
(45) Date of Patent: Jul. 18, 2006

(54) METHOD AND APPARATUS FOR COMMON PACKET CHANNEL ASSIGNMENT

(75) Inventors: Antti Toskala, Helsinki (FI); Mika Raitola, Masala (FI)

(73) Assignee: Nokia Corporation, Espoo (FI)

(*) Notice: Subject to any disclaimer, the term of this patent is extended or adjusted under 35 U.S.C. 154(b) by 871 days.

(21) Appl. No.: 09/790,485

(22) Filed: Feb. 22, 2001

(65) Prior Publication Data

US 2002/0114294 A1  Aug. 22, 2002

Related U.S. Application Data

(60) Provisional application No. 60/184,899, filed on Feb. 25, 2000.

(51) Int. Cl.
*H04Q 7/00* (2006.01)
*H04L 12/413* (2006.01)
*H04B 7/216* (2006.01)

(52) U.S. Cl. .................. 370/329; 370/335; 370/342; 370/349; 370/445; 455/453; 455/509; 455/522

(58) Field of Classification Search ............. 370/342, 370/328, 329, 330, 331, 332, 333, 334, 335, 370/336, 337, 338, 349, 445; 375/130, 141; 455/450, 453, 509, 522
See application file for complete search history.

(56) References Cited

U.S. PATENT DOCUMENTS

| | | | |
|---|---|---|---|
| 5,574,974 A * | 11/1996 | Almgren et al. ............ 455/450 |
| 6,169,759 B1 * | 1/2001 | Kanterakis et al. ......... 375/130 |
| 6,480,525 B1 * | 11/2002 | Parsa et al. ................ 375/141 |
| 6,507,601 B1 * | 1/2003 | Parsa et al. ................ 375/141 |
| 6,621,807 B1 * | 9/2003 | Jung et al. .................. 370/335 |
| 6,643,318 B1 * | 11/2003 | Parsa et al. ................ 375/141 |
| 6,674,739 B1 * | 1/2004 | Lee et al. ................... 370/342 |
| 6,674,787 B1 * | 1/2004 | Dick et al. .................. 375/130 |
| 6,757,319 B1 * | 6/2004 | Parsa et al. ................ 375/141 |
| 6,801,517 B1 * | 10/2004 | Dick et al. .................. 370/342 |
| 6,859,445 B1 * | 2/2005 | Moon et al. ................ 370/335 |
| 6,963,540 B1 * | 11/2005 | Choi et al. .................. 370/252 |
| 2001/0026543 A1 * | 10/2001 | Hwang et al. ............. 370/335 |
| 2001/0046220 A1 * | 11/2001 | Koo et al. ................... 370/335 |
| 2001/0053140 A1 * | 12/2001 | Choi et al. .................. 370/335 |

FOREIGN PATENT DOCUMENTS

JP        2004-171840        11/2004

(Continued)

OTHER PUBLICATIONS

PCT International Search Report dated Oct. 19, 2001.

(Continued)

*Primary Examiner*—Alpus H. Hsu

(57) ABSTRACT

A method and device for initiating uplink data packet communication from a mobile device to a base station on a common packet channel is disclosed. The communication is initiated when the mobile device reads broadcast status of common packet channels, after which the mobile device sends an access preamble to the base station that is acknowledged by the base station, and then the mobile device sends a collision preamble which the base station answers with a matching collision response. If the base station's response to the collision preamble also includes a channel allocation message, then the base station begins uplink data packet communication on an allocated channel provided that the allocated channel previously had free broadcast status. However, if the base station's response to the collision preamble includes a channel allocation message designating channel(s) not previously having free broadcast status, then the mobile device's access attempt is aborted.

23 Claims, 5 Drawing Sheets

FOREIGN PATENT DOCUMENTS

| WO | WO0105050 | 1/2001 |
|----|-----------|--------|
| WO | WO0139416 | 5/2001 |

OTHER PUBLICATIONS

3rd Generation Partnership Project Technical Specification from ETSI, *Universal Mobile Telecommunications System (UMTS); Physical layer procedures (FDD)*, ETSI TS 125 214, version 3.1.1, Release 1999, XP-002175642.

3G TS 25.211, V3.1.1 (Dec. 1999), Physical Channels and Mapping of Transport Channels Onto Physical Channels (FDD).

3G TS 25.212, V3.1.1 (Dec. 1999), Multiplexing and Channel Coding (FDD).

3G TS 25.213, V3.1.1 (Dec. 1999), Spreading and Modulation (FDD).

3G TS 25.214, V3.1.1 (Dec. 1999), Physical Layer Procedures (FDD).

Change Request 25.211-013r5 for CPCH Status Broadcast from 3GPP TSG RAN WG1 Meeting #10 in Beijing, China, Jan. 18-21, 2000.

Change Request 25.211-013rxxx: Addition of Downlink Channel from 3GPP TSG RAN WG1 Meeting #11 in San Diego, CA, Feb. 29-Mar. 3, 2000.

Channel Assignment, UE Channel Selection and CPCH Status Indicator Channel (CSICH), www.3gpp.org/ftp/tsg_ran/WG1_RL1/TSGR10/Docs/Zips/R1-00-0131/zip.

Enhanced CPCH with Channel Assignment, TSGR1#7(99) B13, via the Internet http://www.3gpp.org/ftp/tsg_ran/WG1_RL1_TSGR1_07/Docs/Zips_R1-99b13.zip.

* cited by examiner

METHOD AND APPARATUS FOR COMMON PACKET CHANNEL ASSIGNMENT

This application claims priority from U.S. Provisional Application 60/184,899, filed Feb. 25, 2000.

TECHNICAL FIELD OF THE INVENTION

A method and apparatus for transmitting data from user equipment (UE) to a radio network subsystem within a mobile telephone system, and in particular for selecting the common packet channel (CPCH) to be used for the data transmission, within a universal mobile telephone system (UMTS).

BACKGROUND ART

One of the major problems in mobile telephone systems with packet data transmission in the uplink is how to divide the access resources to different users when the need for resources varies between users at a given point in time.

In current systems, each user is reserved a certain amount of capacity and base station hardware resources during a circuit-switched call for as long as communication capability is needed. However, when using circuit-switched transmission of packet data in this way wherein data to be transmitted is typically very bursty in nature, it is a waste of radio capacity and physical hardware resources to keep a single user's connection reserved all the time according to the greatest possible momentary data transmission need. Thus, packet-switched transmission of packet data is preferable, but having the connection totally disconnected between data transmissions can mean a lengthy process with a lot of signaling via the Random Access Channel (RACH) every time there is data to be transmitted.

In systems based on the code division multiple access (CDMA) method, different users use different uplink scrambling codes. When initiating transmission in a CDMA system, a big concern is how to ensure that the access takes place fast without a lot of signaling via RACH. Also, for longer packets, a major concern is how to take care of power-control to avoid the near-far problem typical of the non-orthogonal coding used in CDMA technology, in order to ensure that user equipment near to a radio network subsystem or base station will not exchange signals at unnecessarily high power compared to different user equipment farther away.

In the current types of systems, the uplink services have not been packet based, or they have been implemented with a circuit switched connection. Also, for some of the services like short message service (SMS), the data amount has been very small. In future systems, the applications are expected to have a larger range, from database applications, to email and internet browsing, to any other TCP/IP traffic, and consequently the current types of systems are not acceptable.

In the downlink, the power control problem is not that severe and, in existing CDMA systems like IS-95A, a downlink power control is not provided at all. In the downlink direction, a greater emphasis is put on sharing the physical resources efficiently, as has been done for example with a downlink shared channel in wideband CDMA (i.e. WCDMA also known as UMTS).

In the UMTS system, the concept of an Uplink Common Packet Channel (Uplink CPCH) has been proposed to solve the uplink access problem. CPCH also has significant advantages for data transmission. However, Uplink CPCH suffers from a reliability problem. Using Uplink CPCH, the proposed channel allocation procedures may lead to two or more user equipments transmitting their data on the same CPCH channel and thus causing excessive interference. Access to a CPCH channel takes time, and thus a channel selected by a first UE may be reserved by a second UE before the first UE completes the access process. In other words, user channel selection (UCS) proceeds by the user selecting and accessing a free CPCH channel according to the description of free channels sent to the UE over a broadcast channel (BCH); however, the delay in the access method and in the BCH transmission may cause UE to access a channel which is already reserved.

Another attempted solution to the uplink access problem has been to use versatile channel assignment (VCAM), where the channel is assigned, after access preambles are exchanged, by way of an acquisition indication channel (AICH). The problem with this related art technique is that AICH typically has an error rate in the range of one percent (1%). VCAM, however, requires reliable signaling, and therefore the high AICH error rate often will cause two UEs to transmit into the same CPCH. The UEs consequently would follow a single power-control stream, often causing severe noise levels at the receiver.

The basic CPCH structure discussed here is based on $3^{rd}$ Generation Partnership Project (3GPP) specifications available to the public. 3G TS 25.211 "Physical channels and mapping of transport channels onto physical channels (FDD)" (Version 3.1.1, December 1999) describes the characteristics of transport channels and physical channels in the frequency division duplex (FDD) mode of UMTS terrestrial radio access (UTRA). 3G TS 25.212 "Multiplexing and channel coding (FDD)" (Version 3.1.1, December 1999) describes the characteristics of multiplexing and channel coding in the FDD mode of UTRA. 3G TS 25.213 "Spreading and Modulation (FDD)" (Version 3.1.1, December 1999) describes spreading and modulation in the FDD mode of UTRA. 3G TS 25.214 "Physical Layer Procedures (FDD)" (Version 3.1.1, 12/1999) specifies and establishes the characteristics of the physical layer procedures in the FDD mode of UTRA. Further, the 3GPP TSG RAN WG1 submission 3GPP R1-00-0175 describes the basic monitoring channel structure (this document is dated Jan. 18–21, 2000).

Submission 3GPP R1-00-0175 is a useful example to understand the background of the present invention, and especially section 5.3.3.8 of that submission, which describes a CPCH status indication channel (CSICH). Likewise, 3G TS 25.214 contains a relevant section 6.2 entitled "CPCH Access Procedures." That section 6.2 lists relevant physical layer parameters; the 18-step access procedure described in section 6.2 is improved by the present invention in order to address the prior art problems discussed above.

DISCLOSURE OF THE INVENTION

It is an object of the invention to solve reliability problems of the uplink CPCH by developing a method and apparatus for improved reliability of the channel allocation within a WCDMA system. This invention combines and improves aspects of existing related art access methods, including UCS and VCAM, in a way which substantially eliminates problems posed by those related art access methods.

The present method is for allocating the channel over which packet data is transmitted from a user equipment to a radio network subsystem, or to a base station within a radio network subsystem. The user equipment (UE) apparatus of the present invention is adapted to carry out that method.

According to this invention, the radio network subsystem may have already informed the user equipment (UE) of one or more possible uplink CPCH channels to be used for packet data transmission if those channels are free. The radio network subsystem may also have already informed the user equipment (UE) of the respective data bit rates, codes, and/or other parameters corresponding to the possible uplink CPCH channels. A primary purpose of the present invention is to efficiently determine which uplink CPCH channel the UE should use to communicate data packets to the radio network subsystem.

A preferred embodiment of the method can be summarized as follows. The UE, upon having the need to transmit data, monitors CPCH status broadcast information transmitted over a special channel called a CPCH status indication channel (CSICH). This CPCH information is broadcast over the CSICH from a base transceiver station (BTS also denoted Node B), informing the UE which channel(s) are free for a particular data rate or rates. The UE then selects, from the free channels, at least one channel which provides at least one of the desired data rates. Then the UE initiates an access procedure, using scrambling and spreading codes and timings, to transmit at least one access preamble according to the parameters of the selected channel(s). Upon receiving acknowledgement from the base station BTS on the corresponding downlink acquisition indication channel (AICH), the UE sends a collision detection preamble which is used to differentiate between simultaneous access attempts by different user equipment that may have been in the access procedure simultaneously on the same physical channel. The UE waits after sending the collision detection preamble until the radio network subsystem responds (via the BTS) with a correct collision detection preamble matching the access preamble sent by the user equipment; the BTS may additionally respond with a channel allocation message to indicate which CPCH channel(s) the UE should use for the data transmission, among the channel(s) previously indicated to be free over the CSICH. Channel allocation messages are sent from the BTS to the UE using the acquisition indication channel (AICH).

If the channel allocation message from the BTS to the UE only indicates a channel or channels not among the channels previously indicated to be free over the CSICH (i.e. no allocated channel is valid), then the access attempt is aborted. Alternatively, if no channel allocation message is sent from the BTS, then data transmission may proceed using one of the channels previously indicated to be free over the CSICH. In certain embodiments of this invention, a radio network subsystem is adapted to use for the channel allocation message values based on the previous status monitoring history, by estimating the time between user equipment status broadcast decoding and the channel allocation phase in the access procedure.

According to the method of the present invention, a channel allocation message from the BTS has a limited set of valid values which must be included within the free channels previously specified by the status broadcast transmission. In other words, a UE will transmit data over an allocated channel only if that channel was previously among the free channels specified over the CSICH when the UE initiated access. In the case where the BTS sends a channel allocation message, and the channel allocation message points to a previously busy channel, the access attempt is aborted and returned to status monitoring. In the case where there is no channel allocation message forthcoming from the BTS, then the UE may begin transmission using one of the free channels previously specified by the status broadcast transmission. This invention also relates to user equipment (UE) apparatus capable of preparing to transmit data packets according to the method just summarized.

This invention is substantially based on restricting the valid channel allocation message values based on the information previously given by the status broadcast transmission. The method and apparatus of the invention provide several advantages. Problems with data transmission reliability are solved for all users in the system, by minimizing the probability for two users to follow a single power control stream and thus create excessive interference. Also, for a single user, reliability problems of the channel allocation message decoding are solved, thereby improving the probability of a successful packet transmission attempt. This invention thereby enables efficient use of radio capacity. Moreover, in the present claimed invention, the effects of delay in channel selection are minimized via the claimed channel assignment method. The channel assignment errors are minimized by increasing the probability that free channels will be assigned. The invention is backward compatible with the related art UE channel selection (UCS) in the sense that the invention can be adapted as a supplement to UCS.

BEST MODE FOR CARRYING OUT THE INVENTION

This invention can be used in the UMTS terrestrial radio access (UTRA) systems based on the 3GPP specifications where it is desired to use the uplink common packet channel (CPCH) for uplink packet data transmission. Further information on UTRA is available in the previously mentioned 3GPP technical specification documents. The invention is not, however, restricted to UTRA, but rather can be used in any radio communication system within the spirit and scope of this invention.

Figure 1:
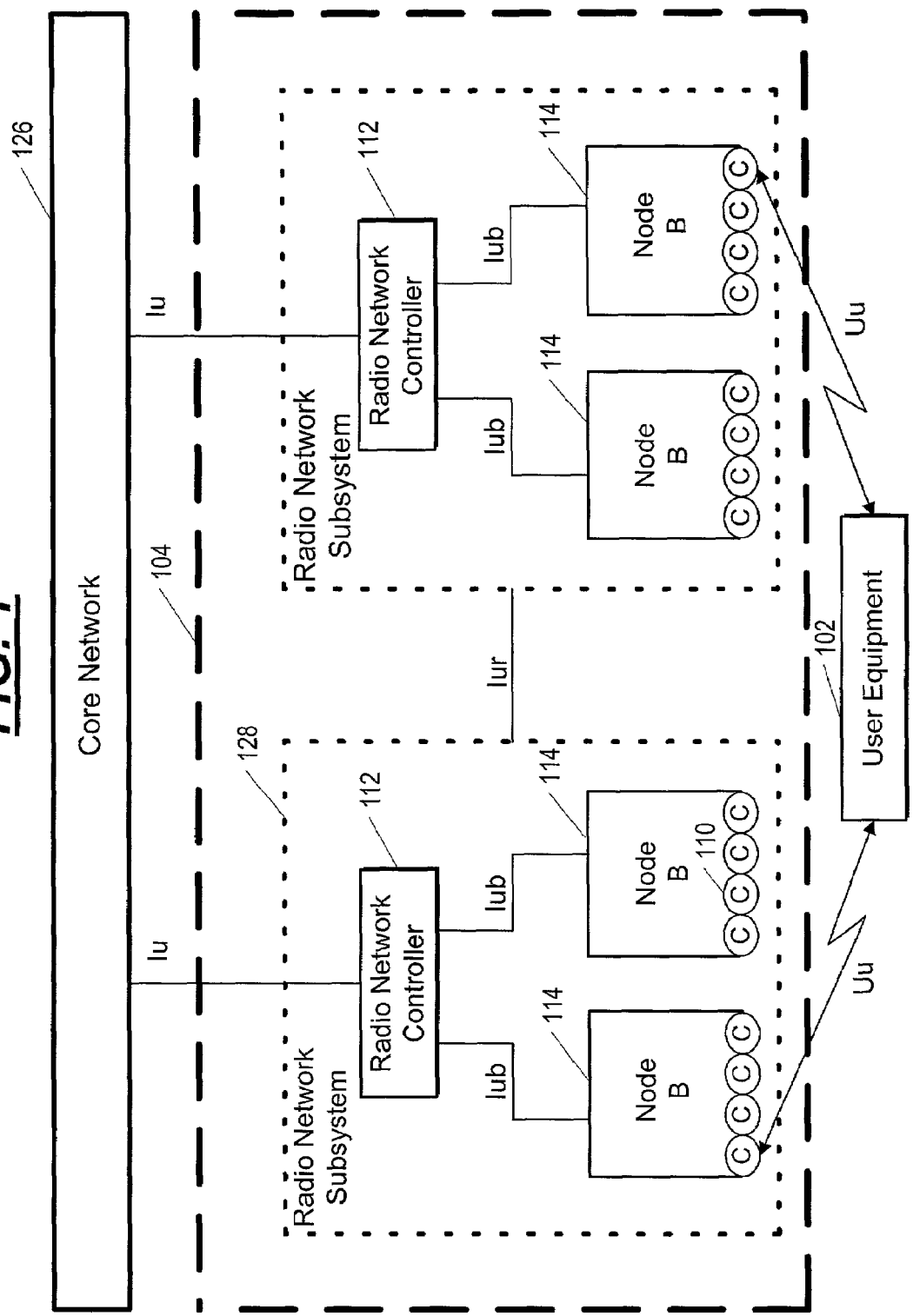
FIG. 1 shows an example of a telecommunications network environment in which the present invention operates.

This invention occurs in the context of a larger wireless telecommunications system, as exemplified by FIG. 1 which shows the structure of a wireless system according to UMTS (which is synonymous with WCDMA or wideband code division multiple access). As can be seen in FIG. 1, the UMTS architecture consists of user equipment 102 (UE which is herein synonymous with "mobile device" or "mobile terminal"), a UMTS Terrestrial Radio Access Network 104 (UTRAN), and a Core Network 126 (CN). The air interface between the UTRAN and the UE is called Uu, and the interface between the UTRAN and the Core Network is called Iu. The UTRAN consists of a set of Radio Network Subsystems 128 (RNS), each of which has geographic coverage of a number of cells 110 (C). The interface between the subsystems is called Iur. Each Radio Network Subsystem 128 (RNS) includes a Radio Network Controller 112 (RNC) and at least one Node B 114, each Node B having geographic coverage of at least one cell 110 (a Node B is often referred to as a base transceiver station (BTS) or simply a base station). As can be seen from FIG. 1, the interface between an RNC 112 and a Node B 114 is called Iub, and the Iub is hard-wired rather than being an air interface. For any Node B 114 there is only one RNC 112. A Node B 114 is responsible for radio transmission and reception to and from the UE 102 (Node B antennas can typically be seen atop tall towers or preferably at less conspicuous locations). The RNC 112 has overall control of the logical resources of each Node B 114 within the RNS 128, and the RNC 112 may also be responsible for handover decisions which entail switching a call from one cell to another or between radio channels in the same cell.

The service area of Node B is referred to here as a cell. There can be many CPCHs in a cell, and UE must select one to be accessed.

Figure 2:
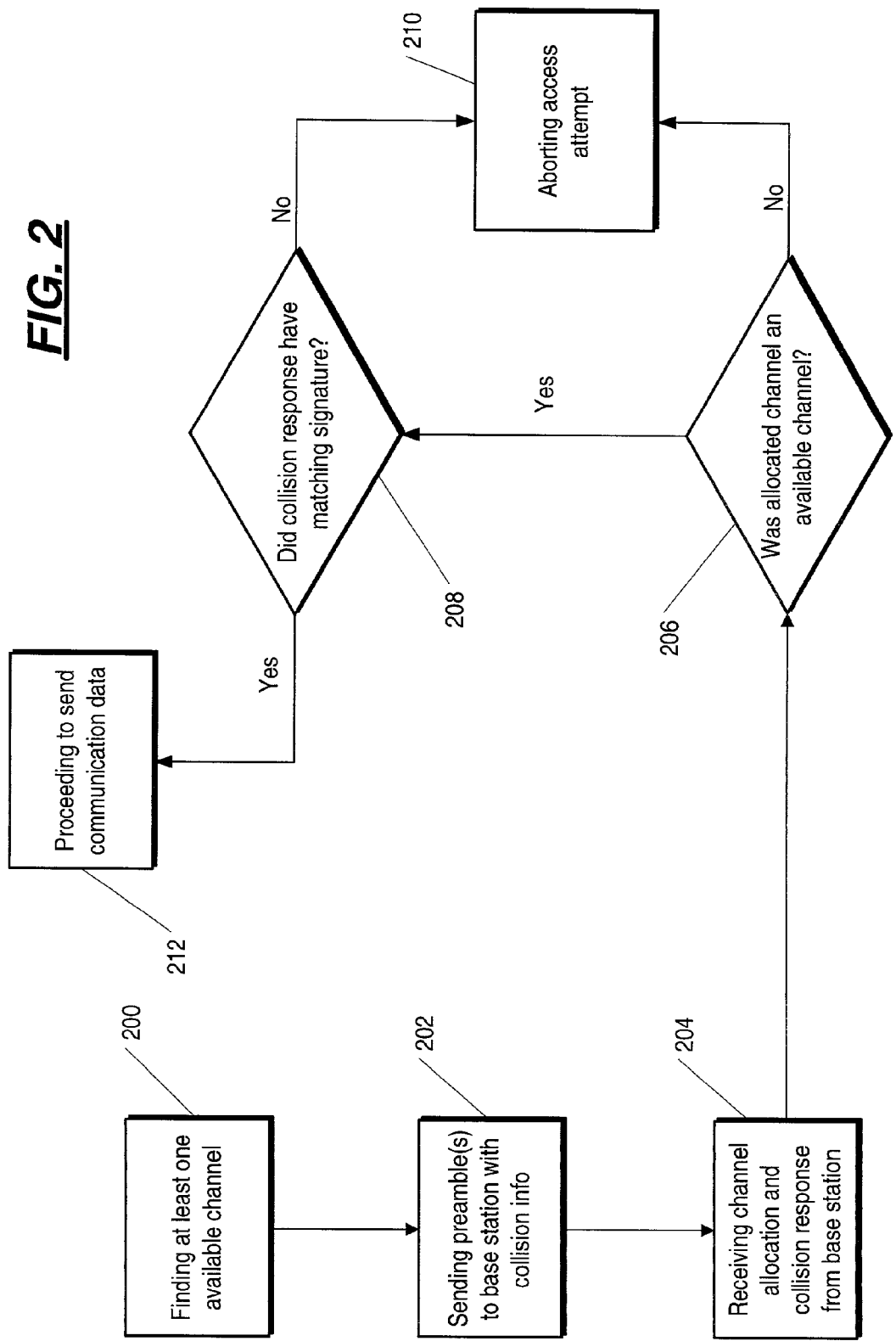
FIG. 2 shows a simple flow chart of the access procedure according to an embodiment of the present invention.

FIG. 2 illustrates a simple embodiment of the present method, according to which a mobile terminal can initiate communication with a base station, the access attempt being made in the context of a wireless telecommunications network. A first step is finding 200 at least one available uplink channel by monitoring a channel status message that is broadcast by the base station. The next step is sending 202 at least one identification signal to the base station, including collision detection information in the form of a randomly selected signature, so that the base station will not confuse the mobile terminal with other mobile terminals. Then, a channel allocation and a collision response signal are received 204 from the base station, the collision response signal being indicative of a signature that can be compared to the randomly selected signature previously sent to the base station. The mobile station proceeds 212 to transmit communication data to the base station on an allocated common packet channel, if the allocated common packet channel was indicated as available by the channel status message, and also provided that the collision response signal indicates a signature matching the randomly selected signature indicated by the identification signal. The access attempt is aborted 210 if the channel allocation did not allocate a channel which had previously been indicated as available by the channel status message.

Figure 3:
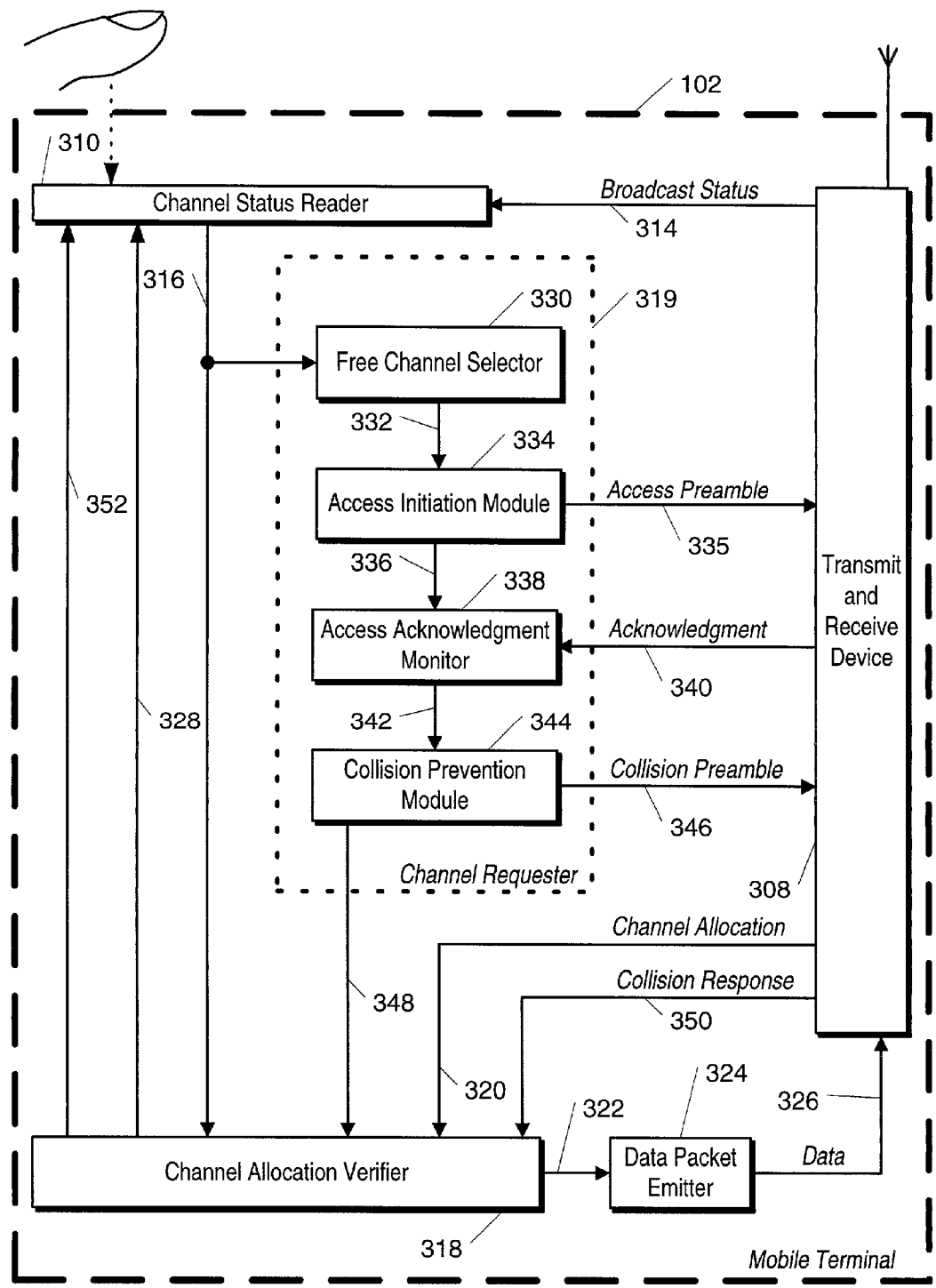
FIG. 3 shows a mobile terminal according to the present invention.

FIG. 3 shows a mobile terminal according to an embodiment of the best mode of the present invention, designed to implement the method illustrated by FIG. 2. A transmit and receive device 308 is shown with various named signals entering and exiting the transmit and receive device 308. Those named signals represent the signaling that may occur in the access phase between UE 102 and Node B 114. It should be noted that this depiction is an approximation that may be varied with different kinds of core networks and RNS deployment scenarios.

During the transmission of data, the UE is power-controlled by the RNS, which is an essential requirement in a CDMA system. The UE typically transmits the data with channel coding and uses interleaving over one or more radio frames to achieve time diversity. The transmission in the uplink is done with I/Q multiplexing having a separate Dedicated Physical Control Channel (DPCCH) and Dedicated Physical Data Channel (DPDCH) sent together as a dual channel compressed QPSK signal. In the downlink direction, the DPCCH and DPDCH are time multiplexed.

The access procedure may occur in an UTRA frequency division duplex (FDD) system. The initial access phase for normal random access operation, for example with registration or location updated or with the CPCH access, has been specified to use a ramping process as indicated by an access preamble signal on a line 335 in FIG. 3. A UE starts at a certain power level based on the UE measurements of the signal strength and of the parameters read from the broadcast channel. The access with preambles is expected to be continued with increasing power level for the 1 ms preamble transmission until the preamble transmission is acknowledged by the base station/RNS or until the transmission needs to be stopped due to excessively high power level or due to the excessive number of preambles transmitted.

With the CPCH procedure, the UE first has been through the random access procedure and has exchanged the necessary parameters on UE capability with the network and has been given permission to access the CPCH channels with a certain data rate or a set of data rates. When the need arises for user equipment to initiate the transmission, the UE needs first to read the status information of the CPCH channels from the CSICH, as indicated by a broadcast status signal on a line 314 in FIG. 3. As mentioned, the related art submission 3GPP R1-00-0175 has a section 5.3.3.8 describing the CSICH. Depending upon whether channel allocation (i.e. channel assignment) is used in the system, the UE may have a different approach. With the channel assignment active, UE is expecting to get a channel allocation message during the access procedure, as indicated by a channel allocation signal on a line 320 of FIG. 3; however, in the other case, UE considers accessing only a single CPCH channel and either gets that particular channel or not during the access procedure. In both cases, UE starts the access procedure with an access preamble signal on a line 335 whereby the preambles are sent, typically with increasing power between consecutive preambles.

The UE 102 observes, after each access preamble, whether the proper acknowledgement arrives in the corresponding acquisition indication channel (AICH) via an acknowledgment signal on a line 340, which is used by the network to indicate that an access preamble has been received. Upon reception of the AICH preamble corresponding to the physical channel used for the access, the UE sends a collision detection (CD) preamble as indicated by a collision preamble signal on a line 346, which is chosen randomly among possible preambles in order to differentiate user equipment and thus avoid collisions in the access procedure. The user equipment waits for the network to respond with the same CD preamble as shown by a collision response signal on a line 350.

In case no channel allocation accompanies the collision response signal on the line 350, then the user equipment starts the transmission at this point as represented by a data signal on a line 326. The transmission may be started with a power control preamble which is a version of the DPCCH frame, for example, with the length of 8 slots, or the data channel may start directly with both DPCCH and DPDCH transmission.

In case a channel allocation signal on the line 320 does accompany the collision response signal on the line 350 (recall that channel allocation may also be denoted as channel assignment), the channel allocation signal on the line 320 points the UE to one of the CPCH channels in the system. The basic method of channel allocation (CA) allows any of the CPCH channels to be chosen and to be used for transmission based on the CA preamble contained in the channel allocation signal on the line 320.

The use of a CA preamble has problems of reliability. The typical error rate is one percent, which means that one out of one hundred access attempts results in the user equipment starting to transmit on an incorrect channel. Because this incorrect channel may already be used by other user equipment, there may be a serious collision when the new user equipment tries to follow the power control intended for another UE.

Thus, in the present invention, the CA preamble error sensitivity is reduced by linking the valid CA combinations to the information provided on the CPCH status indication channel (CSICH). In other words, the values given by the channel allocation signal on the line 320 are linked to the previous broadcast values given by the broadcast status signal on the line 314. If the CSICH information is taken into account when considering the validity of the decoded CA message, the possibility of two users being active on a single code is reduced to a fraction of the probability when basing the decisions on the CA preamble only. A UE 102 will reject any channel pointed out by the CA preamble that was indicated by CSICH to be busy before starting the ramping phase (i.e. before the access preamble signal on the line 335).

The performance improvement of the present invention is due to the fact that, in order to jump on an already busy channel, both the broadcast status signal on the line 314 and the channel allocation signal on the line 320 would need to be decoded incorrectly. Those two signals have some time separation due to the delay in the access procedure, and the decoding events therefore have some independence of the channel state variations. Using this procedure, the error probability in an example case of one percent error rate for both is normally reduced to 0.01 percent error probability or less, which is much easier for the network to tolerate.

Referring again to FIG. 3, an apparatus according to the best mode of the present invention is depicted. This mobile terminal 102 is capable of initiating communication with a base transceiver station 114 in a wireless telecommunication network. The mobile terminal includes a channel status reader 310, which is responsive to user input and to the broadcast status signal on the line 314. The channel status reader 310 will begin operating when a user has a need for data to be communicated to the network. The channel status reader 310 is for providing a free channel information signal on the line 316 indicative of at least one common packet channel that is available according to the base station transceiver 114.

A channel requester 319 is responsive to the free channel information signal on the line 316, and is for providing the access preamble signal on the line 335 having a magnitude indicative of at least one chosen common packet channel that is chosen from the at least one common packet channel that is available according to the base station transceiver 114. A channel allocation verifier 318 is responsive to the free channel information signal on the line 316, and is also responsive to a channel allocation signal on the line 320 having a magnitude indicative of at least one channel allocated by the base transceiver station 114. The channel allocation verifier 318 is for providing a verification signal on a line 322 having a magnitude indicative of whether an allocated channel was previously indicated as available by the channel status reader 310. A data packet emitter 324 is responsive to the verification signal on the line 322, and is for providing the data signal on the line 326 containing power control preamble information followed by data to be communicated over a particular common packet channel (this particular channel may be the allocated channel). As discussed above, the transmit and receive device 308 is responsive to the access preamble signal on the line 335 and to the data signal on the line 326 for transmitting (over an air interface) information contained in those two signals, and is for providing the broadcast status signal on the line 314 and the channel allocation signal on the line 320 after receiving them over the air interface from the base station 114. In this embodiment, the transmit and receive device 308 is for transmitting and receiving information to and from a base transceiver station 114 in a wireless communication network 104 which utilizes wideband code division multiple access.

The channel allocation verifier 318 may also provide an allocation defect signal on a line 328 signifying that attempted access is aborted, if the allocated channel was not previously indicated to be available by the broadcast status signal on the line 314. The channel allocation verifier 318 may also provide an allocation defect signal on a line 328 signifying that attempted access is aborted if an allocated channel was previously indicated to be available but the allocated channel has a different data rate capability from a data rate indicated by the access preamble signal on the line 335. In either case, the access attempt can be aborted.

According to a further embodiment of the best mode of the present invention, the access preamble signal on the line 335 utilizes scrambling and spreading codes and timings, and is transmitted with increasing power level. The channel requester 319 is also responsive to an acknowledgement signal on a line 340 indicative of the base transceiver station 114 having received the access preamble signal on the line 335, and is for subsequently providing a collision preamble signal on a line 346 having a randomly selected detection magnitude to differentiate from other mobile terminals. The channel requester 319 is also for providing a collision monitor signal on a line 348 which activates monitoring for a collision response from the base transceiver station 114. The channel allocation verifier 318 is also responsive to the collision monitor signal on the line 348 and to a collision response signal on a line 350, and is furthermore for providing a collision detection defect signal on a line 352 signifying that attempted access is aborted if the collision response signal on the line 350 indicated a non-matching collision detection, which may mean that the collision response signal on the line 350 includes a signature that does not match a signature indicated by the collision preamble signal on the line 346. The channel status reader 310 is also responsive to the collision detection defect signal on the line 352 by starting a new access attempt. Of course, the transmit and receive device 308 is also responsive to the collision preamble signal on the line 346 by transmitting information contained therein, and is also for providing the collision response signal on the line 350 and the acknowledgment signal on the line 340 after receiving information contained therein.

According to a further embodiment of the best mode of the present invention, the channel status reader 310 starts a new access attempt in response to the allocation defect signal on the line 328 or in response to the collision detection defect signal on the line 352. In other words, instead of being content with failure, the philosophy of this embodiment is to keep trying again, at least within upper limits. If the collision response signal on the line 350 is provided to the channel allocation verifier 318 without the channel allocation signal on the line 320, then the particular common packet channel used for the data signal 326 is included in the at least one chosen common packet channel indicated by the access preamble signal on the line 335.

Thus far, the internal structure of the channel requester 319 has not been detailed. However, a further embodiment of the best mode of the present invention does offer details about various parts of the channel requester 319. A free channel selector 330 is responsive to the free channel information signal on the line 316, and is for providing a selected channel signal on a line 332 indicative of the at least one chosen common packet channel that will be described in the access preamble signal on the line 335. An access initiation module 334 is responsive to the selected channel signal on the line 332, and is for providing the access preamble signal on the line 335 as well as an acknowledgement monitor signal on a line 336 indicating that an acknowledgment should be expected from the base transceiver station 114. An access acknowledgement monitor 338 is responsive to the acknowledgement monitor signal on the line 336 and to the acknowledgment signal on the line 340, and is for providing an acknowledgment receipt signal on a line 342 indicating receipt of acknowledgment. Also, the channel requester 319 includes, in this embodiment, a collision prevention module 344 which is responsive to the acknowledgment receipt signal on the line 342, and which is for providing the collision preamble signal on the line 346, and is for also providing the collision monitor signal on the line 348.

In one preferred embodiment of the best mode of the present invention, the Node B does not try to immediately allocate a channel that has been released (i.e. that could be allocated), because UE 102 may nevertheless encounter information on such a channel during the access process, the channel having been open only temporarily. The most efficient solution is for the Node B to use the CA message to point out channels that have been free longer than the expected duration of the ramping phase in the access procedure.

Figure 4:
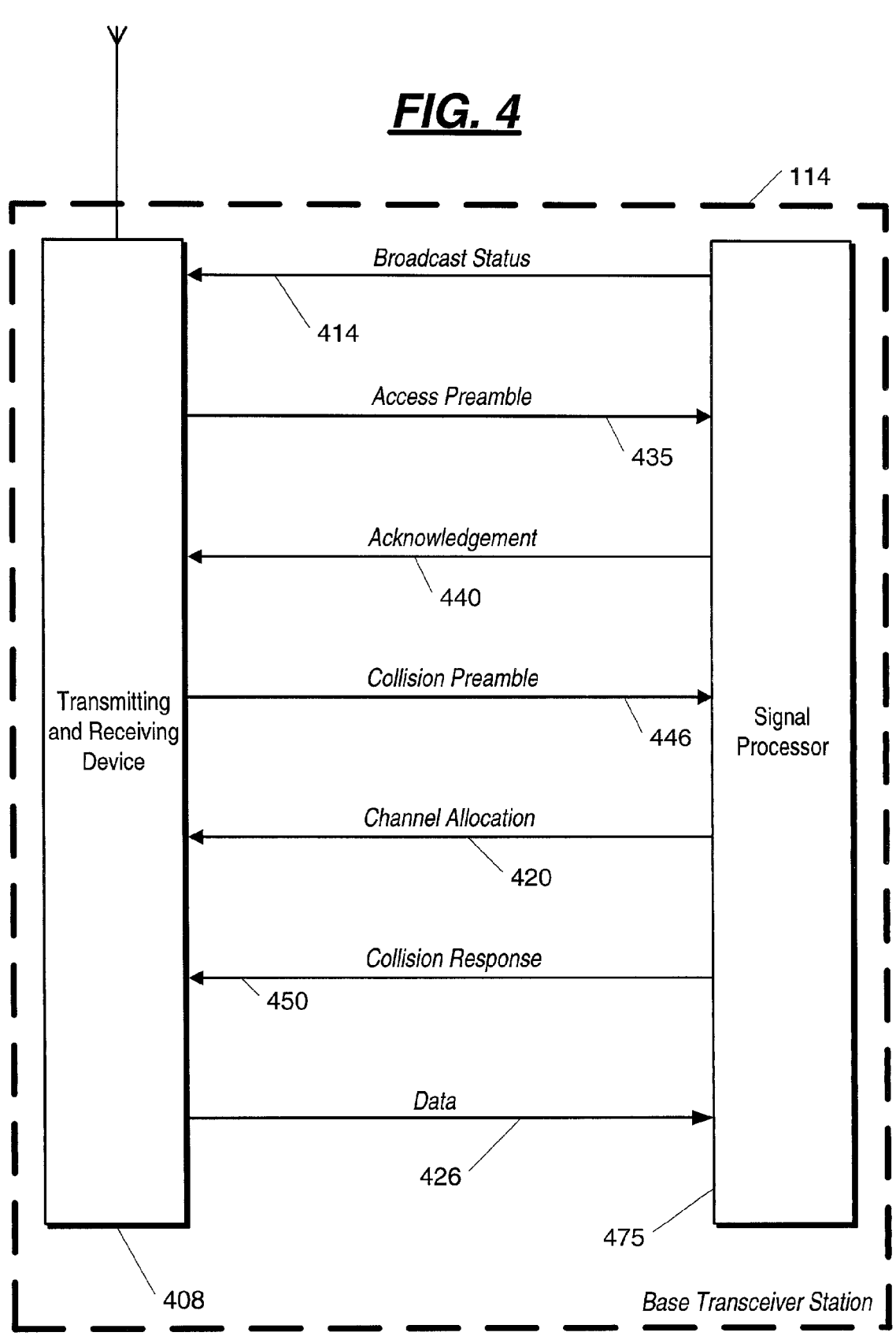
FIG. 4 shows a base transceiver station according to the present invention.

Referring now to FIG. 4, a very simplified diagram of the base transceiver station 114 is shown, according to an embodiment of the best mode of the present invention. The signals shown between the signal processor 475 and the transmitting and receiving device 408 closely correspond to the labeled signals in the mobile terminal 102 of FIG. 3.

This base transceiver station 114 is capable of allowing a mobile terminal 102 to initiate communication with the base transceiver station 114 in a wireless telecommunication network. The base transceiver station 114 includes a signal processor 475 for providing a broadcast status signal 414 in order to broadcast information about availability of channels usable for uplink packet access, and also includes a transmitting and receiving device 408 which is responsive to all signals provided from the signal processor 475 by transmitting information contained therein over an air interface (i.e. every signal from the signal processor to the transmitting and receiving device is transmitted over the air). Likewise, the transmitting and receiving device 408 is also for providing all signals that are provided to the signal processor 475, after receiving information contained therein over the air interface.

Furthermore, the signal processor 475 is responsive to an access preamble signal on a line 435 indicative of an attempt by a mobile device to access a common packet channel previously indicated to be available, and the signal processor 475 is for providing an acknowledgement signal on a line 440 acknowledging receipt of the access preamble signal on the line 435. Also in this embodiment of the best mode of the present invention, the signal processor 475 is responsive to a collision preamble signal on a line 446 which differentiates the mobile terminal's access attempt from simultaneous access attempts by different user equipment, and the signal processor 475 is also for providing a collision response signal on a line 450, indicative of a signature. Moreover, the signal processor 475 is for providing a channel allocation signal on the line 420 responsive to the collision preamble signal on the line 446, in order to allocate at least one common packet channel for communication with the mobile terminal 102 while (as mentioned above) giving priority allocation to common packet channels that have been available a longer time than is necessary to initiate communication. Similarly, it is preferred in this embodiment that the channel allocation signal on the line 420 allocates channels in such order that channels that have been available longer are assigned for packet data transmission before other channels are assigned. Likewise, one of the preferred embodiments of the present invention requires that each access by a mobile terminal is accomplished during an access phase that has an expected access duration, and wherein the channel allocation signal on the line 420 assigns channels in such order that channels allocated first are channels that have been free more time than the expected access duration.

The free common packet channel ultimately used by the UE 102 can have a variety of data bit rate capabilities. In an embodiment of the best mode, the actual data bit rate is decided only based on the channel allocation (CA) preamble decoding. This embodiment, in which the actual data bit rate differs from the data bit rate capability, can be used for implementing system load control.

A UE can operate according to the present invention even if other UEs cannot. In other words, some UEs can support the method described in this invention while other UEs support, for example, pure user channel selection (UCS). In this type of hybrid situation, the UEs supporting the invention will be able to access all CPCH channels, whereas UEs supporting pure UCS will only be able to access those CPCH channels reserved for them. The information about which CPCH channels are reserved for which UEs can be sent along with other cell configuration data over the broadcast channel (BCH), and can also be sent over the CPCH status indication channel (CSICH).

Figure 5:
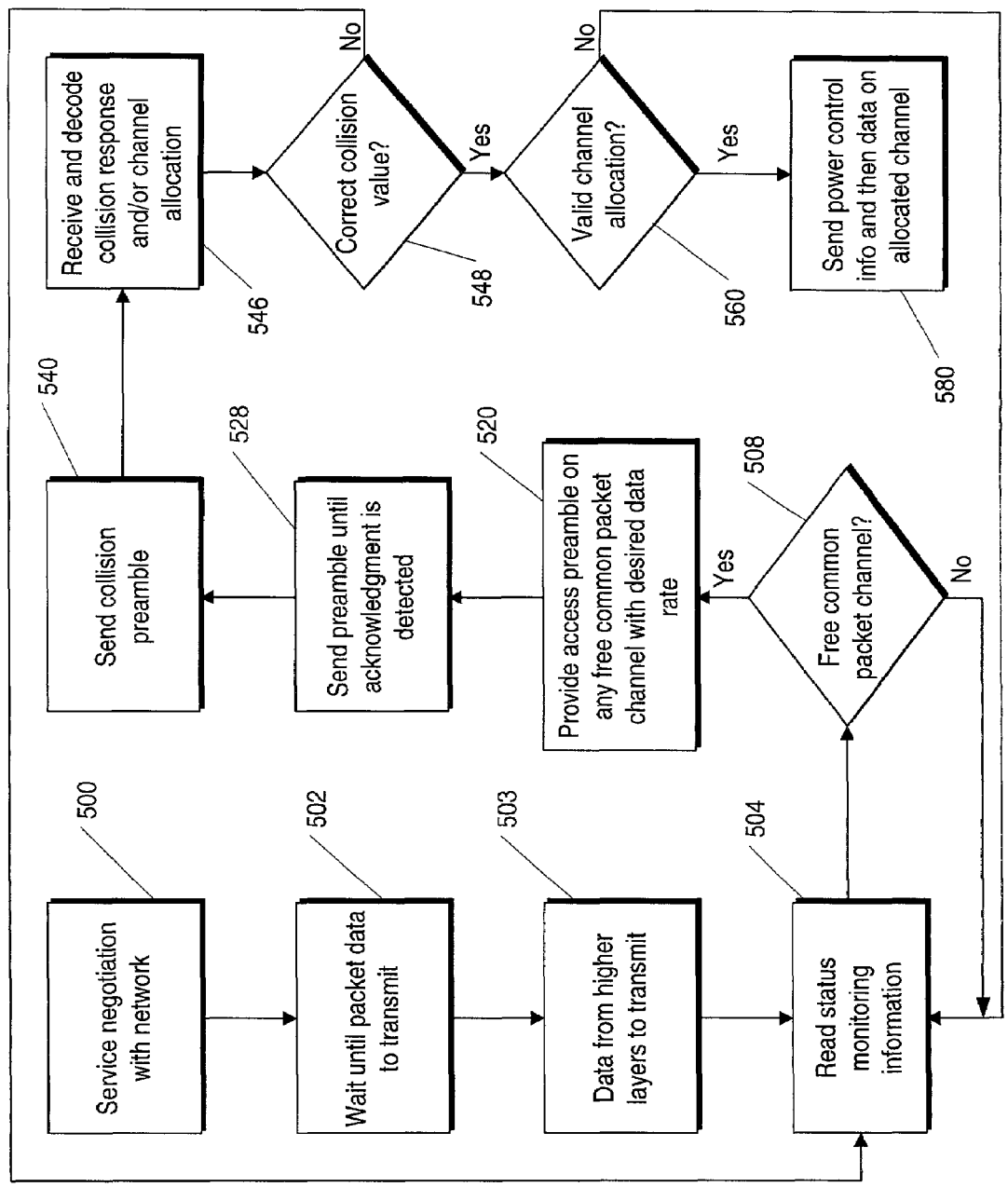
FIG. 5 shows a flow chart of the access procedure according to an embodiment of the present invention.

Referring now to FIG. 5, we have a flow chart of the method corresponding to an embodiment of the best mode of the present invention. Some of the illustrated steps are more important than others in describing the invention. The service negotiation 500 with the network gives a user permission to use given data rate(s) with the uplink CPCH channel for packet data. Typically, there will be an interval of waiting 502 before there is packet data to transmit 503. It is then necessary to read 504 common packet channel status information broadcast by the base transceiver station, and to continue reading the status information until at least one free common packet channel is identified 508. The next step in this embodiment is to provide 520 an access preamble to the base transceiver station, using any free common packet channel offering a desired data rate, the access preamble being indicative of at least one chosen common packet channel that is chosen from the at least one free common packet channel. Providing the access preamble leads to detection 528 of an acknowledgement by the base transceiver station of the access preamble signal, the acknowledgment having been sent from the base transceiver station to the mobile terminal in an acquisition indication channel. Next is sending 540 a collision preamble signal to the base transceiver station in order to differentiate the mobile terminal's access attempt from simultaneous access attempts by different user equipment. Subsequently, the mobile terminal receives 546 a collision response from the network in reply to the collision preamble signal. Finally, the mobile terminal sends 580 a power control preamble and then the data to the base transceiver station on an allocated channel, if the collision response from the network was accompanied or preceded by a channel allocation pointing to the allocated channel, the allocated channel coincides with the at least one free common packet channel previously broadcast by the base transceiver station 560, and the collision response has a signature matching a signature of the collision preamble signal 548.

If the collision response from the network was accompanied by a channel allocation not pointing to a channel coinciding with the at least one free common packet channel previously broadcast by the base transceiver station, then the steps of the method can simply be repeated. The same is true if the collision response from the network has a different signature from a signature of the collision preamble signal.

The access preamble may utilize scrambling and spreading codes and timings, and be transmitted with increasing power level until a response from the base transceiver station 114 arrives. An access attempt may be aborted if the allocated channel has a data rate that is different from data rate(s) of the at least one chosen common packet channel, in which case the steps may be repeated.

Again, a preferred embodiment of this method entails allocating channels in such order that channels that have been available longer are assigned for packet data transmission before other channels are assigned. Each access by a mobile terminal is accomplished during an access phase that has an expected access duration, and the channel allocation may assign channels in such order that channels allocated first are channels that have been free more time than the expected access duration.

For implementing the invention, the preferred means is by software. In order to do so, it would be necessary to make changes for the protocol and transmission control software for the user equipment, as well as for the Node B or radio network controller CA control software.

Even though the invention has been explained in the above with reference to examples in accordance with the accompanying drawing, it is obvious that the invention is not restricted to them but can be modified in many ways by those skilled in the art within the scope of the inventive idea disclosed in the attached claims. Although this invention has been shown and described with respect to best mode embodiments thereof, it should be understood by those skilled in the art that the foregoing and various other changes, omissions and additions in the form and detail thereof may be made therein without departing from the spirit and scope of the invention.

It is to be understood that all of the present Figures, and the accompanying narrative discussions of the best mode embodiments, do not purport to be rigorous treatments of the methods and devices under consideration. For example, FIG. 3 only shows certain blocks of a mobile terminal, and omits many other blocks for the sake of clarity and relevance, as will be evident to a person skilled in the art. Such a person will also understand that the blocks in the Figures, and their interactions, may be rearranged and supplemented within the scope of the present invention, and will understand that those blocks do not necessarily represent discrete hardware components; rather, those blocks can be implemented by combinations of hardware and software in a variety of different combinations and permutations. Likewise, the signals between blocks represent general cause-and-effect relationships that do not exclude intermediate interactions of various types, as will be clear to those skilled in the art.

What is claimed is:

1. A method for a mobile terminal to initiate communication with a base station by making an access attempt, this access attempt being made in the context of a wireless telecommunications network, and the method comprising the steps of:
   finding (200) at least one available uplink channel by monitoring a channel status message that is broadcast by the base station over a status indication channel (CSICH),
   sending (202) at least one identification signal to the base station, including collision detection information so that the base station will not confuse the mobile terminal with other mobile terminals,
   receiving (204) a channel allocation and a collision response signal from the base station;
   proceeding (212) to transmit communication data to the base station on an allocated common packet channel, if the allocated common packet channel was indicated as available by the channel status message broadcast over the status indication channel (CSICH), and also provided that the collision response signal and the collision detection information are indicative of matching signatures,
   aborting (210) the access attempt if the channel allocation received (204) from the base station did not allocate a channel which had previously been indicated as available by the channel status message broadcast over the status indication channel (CSICH).

2. A mobile terminal (102), capable of initiating communication with a base transceiver station (114) in a wireless telecommunication network, the mobile terminal comprising:
   a channel status reader (310), responsive to user input and to a broadcast status signal (314), for providing a free channel information signal (316) indicative of at least one common packet channel that is available according to the base station transceiver (114);
   a channel requester (319), responsive to the free channel information signal (316), for providing an access preamble signal (335) indicative of at least one chosen common packet channel that is chosen from the at least one common packet channel;
   a channel allocation verifier (318), responsive to the free channel information signal (316), and also responsive to a channel allocation signal (320) having a magnitude indicative of at least one channel allocated by the transceiver station (114), for providing a verification signal (322) having a magnitude indicative of whether an allocated channel was previously indicated as available by the channel status reader (310);
   a data packet emitter (324), responsive to the verification signal (322), for providing a data signal (326) containing power control preamble information followed by data to be communicated over a particular common packet channel; and
   a transmit and receive device (308), responsive to the access preamble signal (335) and to the data signal (326) by transmitting information contained therein, and for providing the broadcast status signal (314) and the channel allocation signal (320) after receiving information contained therein.

3. The mobile terminal of claim 2, wherein the transmit and receive device (308) is for transmitting and receiving information to and from a base transceiver station (114), in a wireless communication network (104) which utilizes wideband code division multiple access.

4. The mobile terminal of claim 2, wherein the channel allocation verifier (318) is also for providing an allocation defect signal (328) signifying that attempted access is aborted if the allocated channel was not previously indicated to be available.

5. The mobile terminal of claim 2, wherein the channel allocation verifier (318) is also for providing an allocation defect signal (328) signifying that attempted access is aborted if an allocated channel was previously indicated to be available but the allocated channel has a different data rate capability from a data rate indicated by the access preamble signal (335).

6. The mobile terminal of claim 2, wherein the access preamble signal (335) utilizes scrambling and spreading codes and timings, and is transmitted with increasing power level.

7. The mobile terminal of claim 2, wherein the particular common packet channel is the allocated channel.

8. The mobile terminal of claim 2, wherein:
the channel requester (319) is also responsive to an acknowledgement signal (340) indicative of the base transceiver station (114) having received the access preamble signal (335), and is for subsequently providing a collision preamble signal (346) having a randomly selected detection magnitude to differentiate from other mobile terminals, and is also for providing a collision monitor signal (348) which activates monitoring for a collision response from the base transceiver station (114);
the channel allocation verifier (318) is also responsive to the collision monitor signal (348) and to a collision response signal (350), and is also for providing a collision detection defect signal (352) signifying that attempted access is aborted if the collision response signal (350) indicated a non-matching collision detection;
the channel status reader (310) is also responsive to the collision detection defect signal (352) by starting a new access attempt; and
the transmit and receive device (308) is also responsive to the collision preamble signal (346) by transmitting information contained therein, and is also for providing the collision response signal (350) and the acknowledgment signal (340) after receiving information contained therein.

9. The mobile terminal of claim 8, wherein the non-matching collision detection includes a signature that does not match a signature indicated by the collision preamble signal (346).

10. The mobile terminal of claim 8, wherein the channel status reader (310) starts a new access attempt in response to the allocation defect signal (328) or in response to the collision detection defect signal (352).

11. The mobile terminal of claim 8, wherein the particular common packet channel is included in the at least one chosen common packet channel, if the collision response signal (350) is provided to the channel allocation verifier (318) without the channel allocation signal (320).

12. The mobile terminal of claim 8, wherein the channel requester (319) comprises:
a free channel selector (330), responsive to the free channel information signal (316), for providing a selected channel signal (332) indicative of the at least one chosen common packet channel;
an access initiation module (334), responsive to the selected channel signal (332), for providing the access preamble signal (335) and for providing an acknowledgement monitor signal (336) indicating that an acknowledgment should be expected from the base transceiver station (114);
an access acknowledgement monitor (338), responsive to the acknowledgement monitor signal (336) and to the acknowledgment signal (340), for providing an acknowledgment receipt signal (342) indicating receipt of acknowledgment; and
a collision prevention module (344), responsive to the acknowledgment receipt signal (342), for providing the collision preamble signal (346), and for providing the collision monitor signal (348).

13. A base transceiver station (114) capable of allowing a mobile terminal (102) to initiate communication with the base transceiver station (114) in a wireless telecommunication network, the base transceiver station (114) comprising:
a signal processor (475), for providing a broadcast status signal (414) in order to broadcast information about availability of channels usable for uplink packet access; and
a transmitting and receiving device (408), responsive to all signals provided from the signal processor (475) by transmitting information contained therein over an air interface, and for providing all signals that are provided to the signal processor (475) after receiving information contained therein over the air interface,
wherein the signal processor (475) is responsive to an access preamble signal (435) indicative of an attempt by a mobile device to access a common packet channel previously indicated to be available, for providing an acknowledgement signal (440) acknowledging receipt of the access preamble signal (435);
wherein the signal processor (475) is responsive to a collision preamble signal (446) which differentiates the mobile terminal's access attempt from simultaneous access attempts by different user equipment, for providing a collision response signal (450) having a signature; and
wherein the signal processor (475) also is for providing a channel allocation signal (420) responsive to the collision preamble signal (446), in order to allocate at least one common packet channel for communication with the mobile terminal (102) while giving priority allocation to common packet channels that have been available a longer time than is necessary to initiate communication.

14. The base transceiver station of claim 13, wherein the channel allocation signal (420) allocates channels in such order that channels that have been available longer are assigned for packet data transmission before other channels are assigned.

15. The base transceiver station of claim 13, wherein each access by a mobile terminal is accomplished during an access phase that has an expected access duration, and wherein the channel allocation signal (420) assigns channels in such order that channels allocated first are channels that have been free more time than the expected access duration.

16. A method of initiating transmission of data from a mobile terminal (102) to a base transceiver station (114), comprising the steps of:
(a) reading (504) common packet channel status information broadcast by the base transceiver station over a status indication channel (CSICII), and continuing to read the status information until at least one free common packet channel is identified;
(b) providing (520) an access preamble to the base transceiver station, using any free common packet channel offering a desired data rate, the access preamble being indicative of at least one chosen common packet channel that is chosen from the at least one free common packet channel (c) detecting (528) an acknowledgement of the access preamble signal from the base transceiver station, sent from the base transceiver station to the mobile terminal in an acquisition indication channel;

(d) sending (540) a collision preamble signal to the base transceiver station in order to differentiate the mobile terminal's access attempt from simultaneous access attempts by different user equipment;

(e) receiving (546) a collision response from the network in reply to the collision preamble signal; and (f) sending (580) a power control preamble and then the data to the base transceiver station on an allocated channel, if the collision response from the network was accompanied or preceded by a channel allocation pointing to the allocated channel, and the allocated channel coincides with the at least one free common packet channel previously identified in the broadcast by the base transceiver station over the status indication channel (CSICH), and also the collision response has a signature matching a signature of the collision preamble signal, wherein the channel allocation is received in reply to the collision preamble signal.

17. The method of claim 16, wherein the steps are repeated if the collision response from the network was accompanied by a channel allocation not pointing to a channel coinciding with the at least one free common packet channel previously broadcast by the base transceiver station.

18. The method of claim 16, wherein the steps are repeated if the collision response from the network has a different signature from a signature of the collision preamble signal.

19. The method of claim 16, wherein the access preamble signal utilizes scrambling and spreading codes and timings, and is transmitted with increasing power level.

20. The method of claim 16, wherein an access attempt is aborted if the allocated channel has a data rate that is different from data rate(s) of the at least one chosen common packet channel, in which case the steps are repeated.

21. The method of claim 16. wherein the channel allocation allocates channels in such order that channels that have been available longer are assigned for packet data transmission before other channels are assigned.

22. The method of claim 16, wherein each access by a mobile terminal is accomplished during an access phase that has an expected access duration, and wherein the channel allocation assigns channels in such order that channels allocated first are channels that have been free more time than the expected access duration.

23. A system for initiating transmission of data from a mobile terminal (102) to a base transceiver station (114), comprising:

(a) means for reading (504) common packet channel status information broadcast by the base transceiver station over a status indication channel (CSICH), and for continuing to read the status information until at least one free common packet channel is identified;

(b) means for providing (520) an access preamble to the base transceiver station, using any free common packet channel offering a desired data rate, the access preamble being indicative of at least one chosen common packet channel that is chosen from the at least one free common packet channel;

(e) means for detecting (528) an acknowledgement of the access preamble signal from the base transceiver station, sent from the base transceiver station to the mobile terminal in an acquisition indication channel;

(f) means for sending (540) a collision preamble signal to the base transceiver station in order to differentiate the mobile terminal's access attempt from simultaneous access attempts by different user equipment;

(e) means for receiving (546) a collision response from the network in reply to the collision preamble signal; and (f) means for sending (580) a power control preamble and then the data to the base transceiver station on an allocated channel, if the collision response from the network was accompanied or preceded by a channel allocation pointing to the allocated channel, and the allocated channel coincides with the at least one free common packet channel previously identified in the broadcast by the base transceiver station over the status indication channel (CSICH), and also the collision response has a signature matching a signature of the collision preamble signal, wherein the channel allocation is received in reply to the collision preamble signal.

* * * * *